(12) United States Patent
Evans et al.

(10) Patent No.: US 11,954,518 B2
(45) Date of Patent: Apr. 9, 2024

(54) USER-DEFINED METERED PRIORITY QUEUES

(71) Applicant: Nvidia Corporation, Santa Clara, CA (US)

(72) Inventors: Jonathon Evans, Santa Clara, CA (US); Lacky Shah, Los Altos Hills, CA (US); Phil Johnson, San Jose, CA (US); Jonah Alben, San Jose, CA (US); Brian Pharris, Cary, NC (US); Greg Palmer, Cedar Park, TX (US); Brian Fahs, San Jose, CA (US)

(73) Assignee: Nvidia Corporation, Santa Clara, CA (US)

( * ) Notice: Subject to any disclaimer, the term of this patent is extended or adjusted under 35 U.S.C. 154(b) by 232 days.

(21) Appl. No.: 16/722,422

(22) Filed: Dec. 20, 2019

(65) Prior Publication Data
US 2021/0191754 A1 Jun. 24, 2021

(51) Int. Cl.
*G06F 9/48* (2006.01)
*G06N 3/08* (2023.01)

(52) U.S. Cl.
CPC ............ *G06F 9/4831* (2013.01); *G06N 3/08* (2013.01)

(58) Field of Classification Search
None
See application file for complete search history.

(56) References Cited

U.S. PATENT DOCUMENTS

| | | | | |
|---|---|---|---|---|
| 6,918,111 B1* | 7/2005 | Damron | ............... | G06F 8/4442 712/202 |
| 7,822,886 B1* | 10/2010 | Miller | ...................... | G09G 5/36 710/29 |
| 8,428,075 B1* | 4/2013 | Johnson | .................. | G06F 9/544 370/412 |
| 8,738,860 B1* | 5/2014 | Griffin | ............... | G06F 12/0897 711/122 |
| 2002/0083063 A1* | 6/2002 | Egolf | ........................ | G06F 9/52 |
| 2002/0166007 A1* | 11/2002 | Goudie | ................. | G06F 13/362 710/52 |
| 2003/0035373 A1* | 2/2003 | Bass | ....................... | H04L 47/30 370/230.1 |
| 2005/0147038 A1* | 7/2005 | Chandra | ............... | G06F 13/128 370/235 |
| 2005/0160178 A1* | 7/2005 | Venables | ............. | H04L 12/5601 709/233 |
| 2005/0185583 A1* | 8/2005 | Hosein | .................. | H04L 1/0017 370/232 |
| 2006/0149787 A1* | 7/2006 | Surlaker | ................. | G06F 9/546 |
| 2006/0192850 A1* | 8/2006 | Verhaegh | ............. | H04N 19/172 348/14.12 |

(Continued)

FOREIGN PATENT DOCUMENTS

| | | |
|---|---|---|
| AU | 2005338260 A1 | 5/2007 |
| CN | 103140831 A | 6/2013 |

(Continued)

*Primary Examiner* — Adam Lee
(74) *Attorney, Agent, or Firm* — Hogan Lovells US LLP

(57) ABSTRACT

Apparatuses, systems, and techniques to optimize processor resources at a user-defined level. In at least one embodiment, priority of one or more tasks are adjusted to prevent one or more other dependent tasks from entering an idle state due to lack of resources to consume.

19 Claims, 6 Drawing Sheets

(56) References Cited

U.S. PATENT DOCUMENTS

| | | | | |
|---|---|---|---|---|
| 2007/0169123 A1* | 7/2007 | Hopkins | | G06F 9/524 718/100 |
| 2007/0263245 A1* | 11/2007 | Carney | | G06F 9/52 358/1.15 |
| 2008/0066066 A1* | 3/2008 | MacPherson | | G06F 9/5027 718/100 |
| 2008/0109809 A1* | 5/2008 | Morishita | | G06F 9/3802 718/103 |
| 2010/0191525 A1* | 7/2010 | Rabenko | | H04L 7/0029 704/211 |
| 2011/0225590 A1* | 9/2011 | Thomson | | G06F 9/4881 718/103 |
| 2012/0317579 A1* | 12/2012 | Liu | | G06F 11/1438 718/104 |
| 2014/0153387 A1* | 6/2014 | Wu | | H04L 47/36 370/252 |
| 2014/0331233 A1 | 11/2014 | Matskevich et al. | | |
| 2015/0019655 A1* | 1/2015 | Kizhakkiniyil | | H04L 67/564 709/206 |
| 2015/0212794 A1* | 7/2015 | Otenko | | G06F 5/065 710/109 |
| 2016/0011936 A1* | 1/2016 | Luby | | G06F 3/067 714/6.2 |
| 2016/0077545 A1* | 3/2016 | Burleson | | G06F 1/3296 713/300 |
| 2016/0291977 A1* | 10/2016 | Bai | | G06F 9/505 |
| 2016/0371122 A1* | 12/2016 | Nair | | G06F 9/546 |
| 2017/0034277 A1* | 2/2017 | Jackson | | H04L 12/46 |
| 2017/0289242 A1* | 10/2017 | Keppel | | H04L 67/1008 |
| 2017/0357509 A1* | 12/2017 | Jain | | G06F 1/324 |
| 2020/0219609 A1* | 7/2020 | Harte | | G16H 15/00 |
| 2021/0256362 A1* | 8/2021 | Lie | | G06F 11/14 |

FOREIGN PATENT DOCUMENTS

| | | |
|---|---|---|
| CN | 104657214 A | 5/2015 |
| CN | 104657221 A | 5/2015 |
| CN | 110494848 A | 11/2019 |
| WO | 2007057728 A1 | 5/2007 |
| WO | 2019030410 A1 | 2/2019 |

* cited by examiner

USER-DEFINED METERED PRIORITY QUEUES

FIELD

The present application relates generally to optimizing work efficiency of one or more processes that share processing resources. For example, an application or a task of an application may perform work that is then consumed by a second task or application. The work performed by the first task or application can affect the efficiency of the second task or application, so optimizing the work done by both tasks or applications can reduce unnecessary and inefficient consumption of processing resources.

BACKGROUND

Task pipelines are common in many applications and often require multiple components to work together to complete a final output. In many instances, a first task (or set of tasks each working in parallel) may receive input and process the input to produce intermediate output. The intermediate output may then be provided to another task (or set of tasks working in parallel) to produce a final output. However, a single processor may perform all of the tasks, with processor time being split between all of the tasks. In some instances, one or more of the dependent tasks may consume input faster than another feeder task can generate the input for that task.

DETAILED DESCRIPTION

Figure 1:
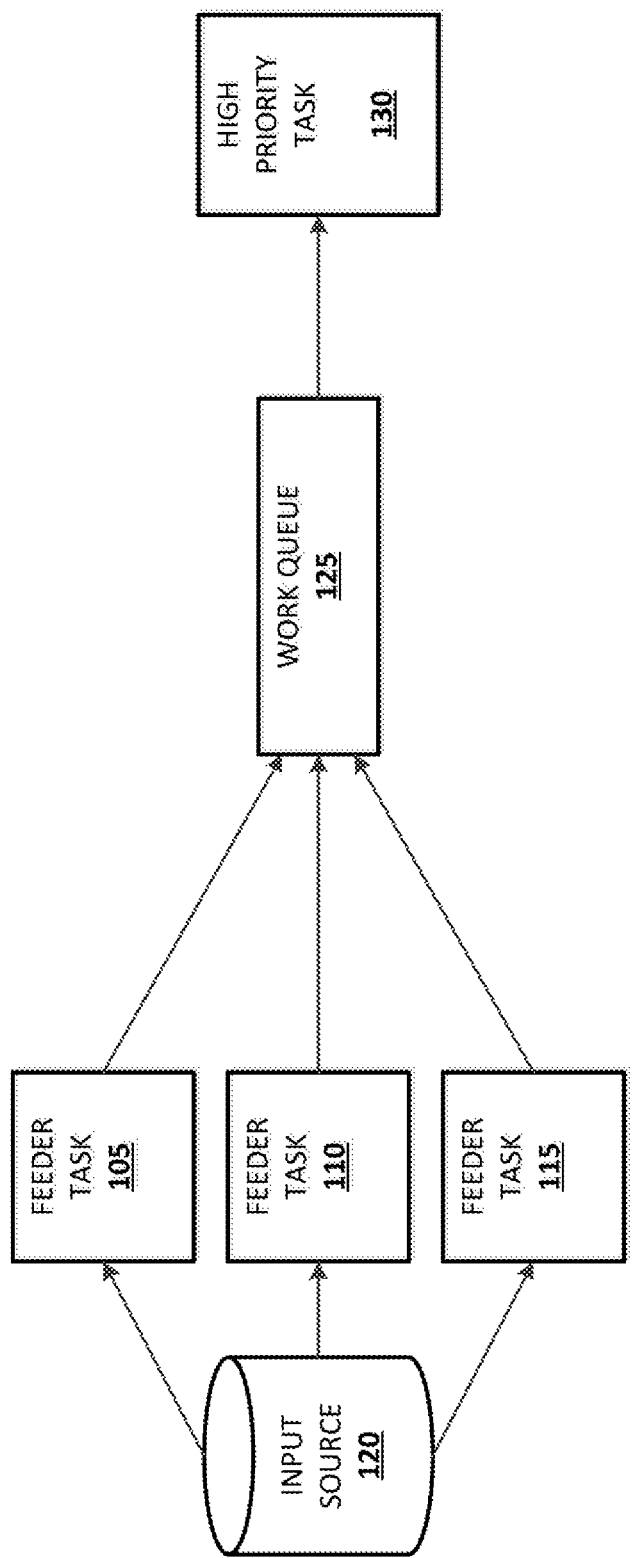
FIG. 1 illustrates an example task pipeline, according to at least one embodiment.

When executing an application that includes multiple dependent tasks, one or more of the tasks may execute at a faster rate than others. For example, a task may, at various times, process input that is less complex than input received at other times. Also, for example, one or more tasks may always execute at a faster rate due to the nature of the processing performed by those tasks. In some instances, one or more tasks may receive, as input, intermediate output from one or more other tasks. In order for the dependent task to perform its operations, it may be necessary for one or more other feeder tasks to complete its processing to generate intermediate output to be consumed by the dependent task. If the dependent task does not have the necessary input to continue processing, that task may sit idle, which may waste processing and/or memory resources. Thus, in instances where a task is consuming output from one or more other tasks, it can be beneficial to prioritize some feeder tasks, at least temporarily, to ensure that a dependent task does not run out of available input.

As an example, image processing pipelines often include multiple tasks that perform image processing. Images may undergo pre-processing before being provided, for example, to train a deep neural network (DNN). The training and/or inferencing of a DNN is often a resource-intensive task which can take up a significant amount of processor time and resources. Thus, the tasks that pre-process images to provide to a DNN may have a lower priority in a work queue than the DNN, so fewer resources may be available to pre-process images. However, this becomes an issue when the DNN, which may be allocated a higher priority in a work queue, no longer has pre-processed images to consume. In that case, there may be switching back and forth between the image processing tasks, which have a lower priority, and training and/or use of the DNN, which has a higher priority but is unable to perform more work because of a lack of pre-processed images the DNN requires in order to continue operating. The DNN will still take up significant memory resources even if no work is being completed.

To alleviate the unnecessary switching between the lower priority feeder tasks (i.e., tasks that consume input and produce output to be utilized by other higher priority tasks) and a higher priority task, the priority of the tasks may be adjusted to allow for more input to be available for the high priority task. By monitoring the amount of work for the higher priority task that is available for consumption in a work queue, the processing time allocated for the feeder tasks may be increased (if the work queue is running low) or decreased (if the higher priority task has ample input to consume in the work queue).

In some embodiments, both the feeder tasks and the high priority tasks may be part of the same application. Thus, the application itself can monitor the progress of the tasks and determine how the tasks will be sent to a processor to allow the tasks to execute. For example, an application may include a plurality of tasks, each of which receives some input and performs an operation on the input. Each of the tasks may then send output to a work queue, whereby another task (or plurality of tasks) identifies the output and consumes the intermediate output as input.

Referring to FIG. 1, an example of a task pipeline 100 is illustrated. The feeder tasks 105, 110, and 115 receive input from an input source 120, which is then processed by the feeder tasks into intermediate output. The intermediate output is provided to a work queue 125, which temporarily stores the output for later consumption by the high priority task 130. Thus, the high priority task 130 may only execute when there is intermediate output waiting in the work queue. If, at some time, the feeder tasks 105, 110, 115 are processing input but have not yet provided any output to the work queue 125, the high priority task 130 may be required to wait idly until additional output is received by the work queue 125.

In some embodiments, the high priority task may still continue to consume the same amount of processor time. For example, a high priority task may be allocated 80% of processing time while other tasks are allocated the other 20%. If the high priority task is idle because no input is available in the work queue 125, the high priority task may still be allocated 80% of the processing time even if no processing is taking place, thus wasting resources that could otherwise be allocated to the feeder tasks to speed up the availability of intermediate output for the high priority task to consume.

In some embodiments, the priority of one or more high priority tasks may be adjusted to allow for other tasks to take up a larger portion of processing power. For example, a high priority task may be waiting idly for additional input that is still being processed by feeder tasks. By lowering the priority of the high priority task and/or increasing the priority of feeder tasks, additional work may accumulate and the high priority task may then more efficiently utilize its allocated processing time. Continuing with the previous example, if the work queue 125 is empty, the percentage of processing resources (e.g., time) allocated to the high priority task may be adjusted to 30% for a period of time, thus reducing the amount of input required for that time (i.e., the high priority task is running slower by being allocated less resources, input is consumed slower). The remaining 70% of processing resources may then be allocated to the feeder tasks, thereby speeding up the rate at which intermediate output is provided to the work queue 125. The new allocation of processing resources may continue indefinitely or can be monitored to determine when the adjusted priorities are unnecessary. Further, the priorities can continue to be adjusted until an optimal processing allocation can be determined.

Figure 2:
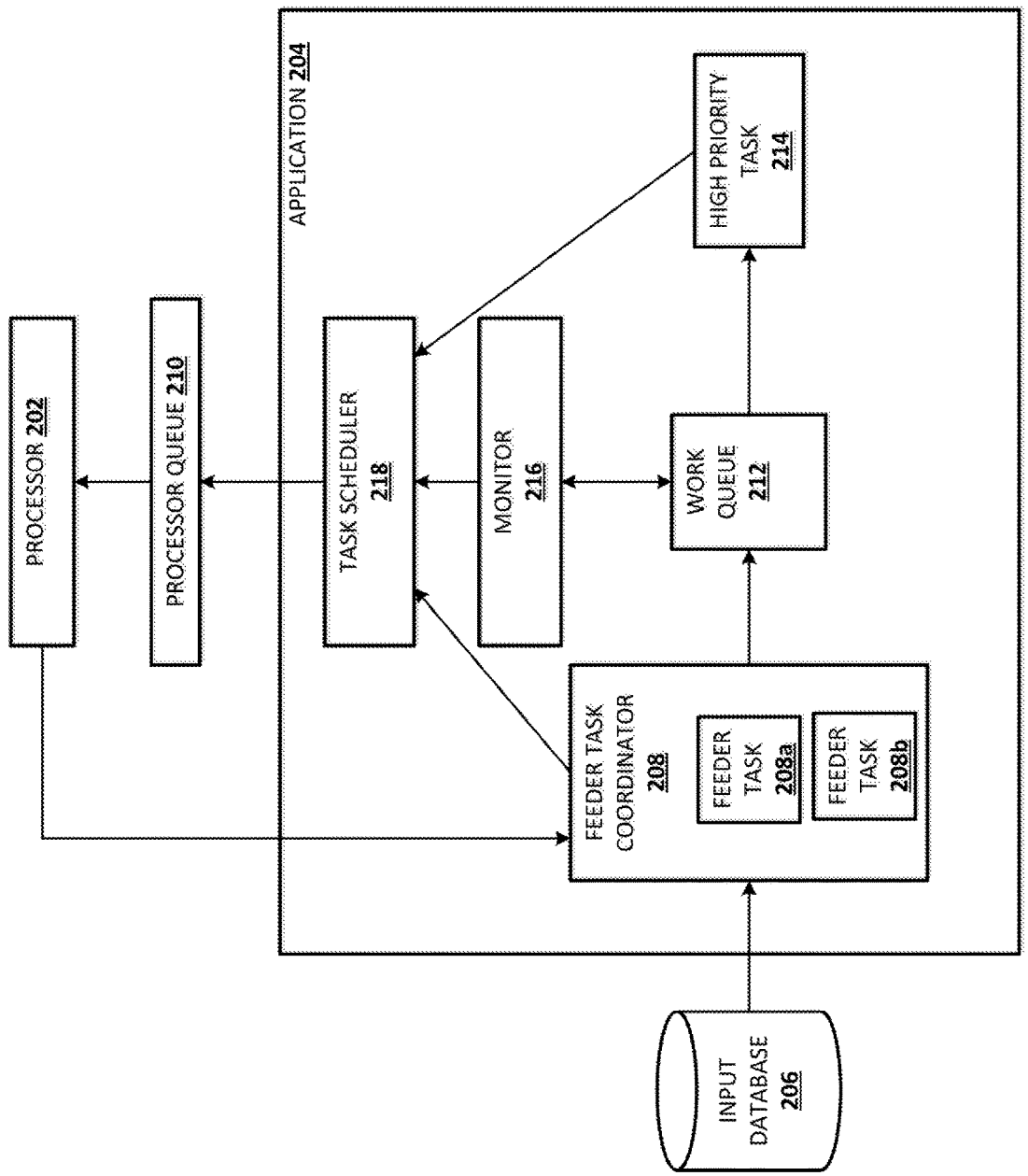
FIG. 2 illustrates an example environment in which embodiments described herein may be implemented.

Referring to FIG. 2, an example environment is provided in which embodiments disclosed herein may be implemented. The environment includes a processor 202 that processes tasks that are provided by one or more applications. The tasks are received from the processor queue 210, which temporarily stores tasks that are to be completed by the processor. The processor may divide up processing time based on priorities associated with the tasks in the processor queue 210. Thus, for tasks that are of a higher priority (e.g., tasks critical to one or more operations), more time may be allotted for execution by the processor or those tasks may be completed and/or processed before other lower priority tasks. In some embodiments, a task may be partially completed and then returned to the processor queue 210 for completion at a later time.

The environment further includes application 204. In some embodiments, application 204 may be executing on processor 202 such that the application as a whole has a priority setting in the priority queue. In some embodiments, multiple applications may be executing via processor 202, each with its own priority, and processing time may be allocated between the applications based on the associated priorities. In some embodiments, application 204 may be executing on a separate processor (or multiple processors running in parallel) and only particular tasks that require processing by the processor can be provided to the processor queue 210. For example, application 204 may be executing on a processor and one or more image processing tasks may be separately assigned to processor 202 which may be better suited to perform those tasks, such as a graphics processing unit to process image data.

Input database 206 includes input data that is to be consumed by components of the application 204. The input database may comprise a hard disk drive, a floppy disk drive, a CD-ROM device, a flash memory device, or other mass storage device. As an example, input database may include image data and the image data may be provided to the application 202. The application includes a feeder task coordinator 208 which receives input data from input database 206 and provides the data to one or more tasks that process the input and provide intermediate output.

As illustrated, feeder task coordinator 208 is associated with two feeder tasks 208a and 208b. In some embodiments, feeder task coordinator 208 can be associated with a single feeder task or more than two feeder tasks. In some embodiments, the feeder tasks 208a and 208b can directly access the input database 206 and coordination of the input, such as assigning particular data to particular tasks, can be performed directly by the feeder tasks 208a and 208b.

Each of the feeder tasks 208a and 208b performs one or more operations of the input received from input database 206. When a feeder task has input data to be processed, the task is provided to the task scheduler 218, which then provides the task to the processor queue 210. As tasks are processed by the processor 202, output is generated and sent to the feeder task coordinator for additional processing. For example, feeder task 208a may be a task to perform preprocessing on an image from input database 206. The task is sent to the task scheduler 218 and then sent to the processor queue 210. The processor 202 processes the task based on a priority of the application 204 that is submitting the task, and output is provided back to the feeder task coordinator 208.

Once a feeder task has completed, the output of the feeder task is provided to a work queue 212 and queued for one or more high priority tasks 214. The work queue 212 includes the intermediate output that has been processed by the feeder tasks but that has yet to be consumed by other tasks into final output. Thus, high priority task 214 is dependent on the intermediate output that is in the work queue 212 and consequently dependent on the feeder tasks to complete processing. Like the feeder tasks 208a and 208b, the high priority task 214, once it has input, is provided to the task scheduler 218 and then to the processor queue 210 for processing by the processor 202.

The task scheduler 218 coordinates the various tasks of the application 204 that are to be processed by processor 202. In some embodiments, each task may be associated with a priority and task scheduler 218 may provide the tasks for completion based on the priorities of the tasks. For example, task scheduler 218 can receive tasks from feeder task coordinator 208 and from high priority task 214 and determine, based on associated priorities, the order in which to provide the tasks to processor queue 210 for processing by processor 202. Therefore, task scheduler 218 acts as a gateway to determine the order in which tasks are processed. Thus, the order in which the tasks are provided to processor queue 210 can be adjusted by the task scheduler 218 to promote one or more tasks to a higher priority and/or demote one or more tasks to a lower priority for processing by the processor 202.

In some embodiments, the order or priority that tasks are given by the task scheduler 218 can be determined based on a state of the work queue 212. In some embodiments, task scheduler 218 may directly monitor the work queue 212. In some embodiments, a queue monitor 216 may monitor work queue 212 and provide an indication of the state of the work queue 212 to the task scheduler 218. For example, the queue monitor 216 may use a synchronization mechanism that indicates whether the work queue 212 is empty or full, or whether the work queue 212 is emptying of queued intermediate output faster than the intermediate input is being provided to the work queue 212.

A synchronization mechanism, or synchronization primitive, is a structure that can be used to monitor the status of the work queue 212 and determine when tasks may be scheduled or halted so that tasks of higher priority can yield to lower priority tasks, such as feeder tasks. As work is processed in the work queue 212 such that a higher priority task may not have intermediate output to process, the synchronization mechanism may may be used to decide to halt or reduce tasks from the higher priority tasks to allow for additional intermediate output to accumulate in the work queue 212. In some embodiments, the synchronization mechanism may be used to increase a flow of intermediate output to the work queue 212 by allowing feeder tasks a higher priority. As a component of the queue monitor 216, the synchronization mechanism may provide task scheduler 218 with an indication that may be utilized by the task scheduler 218 to determine an order or schedule for the incoming high priority tasks and feeder tasks.

In some embodiments, when the monitor 216 indicates that high priority task 214 is likely to run out of work in the work queue 212, task scheduler 218 can lower the priority of the high priority task 214 to allow for more processing time to be allocated to the feeder tasks 208a and 208b. In some embodiments, task scheduler 218 may increase a priority of feeder tasks 208a and 208b to accomplish the same result.

Figure 3:
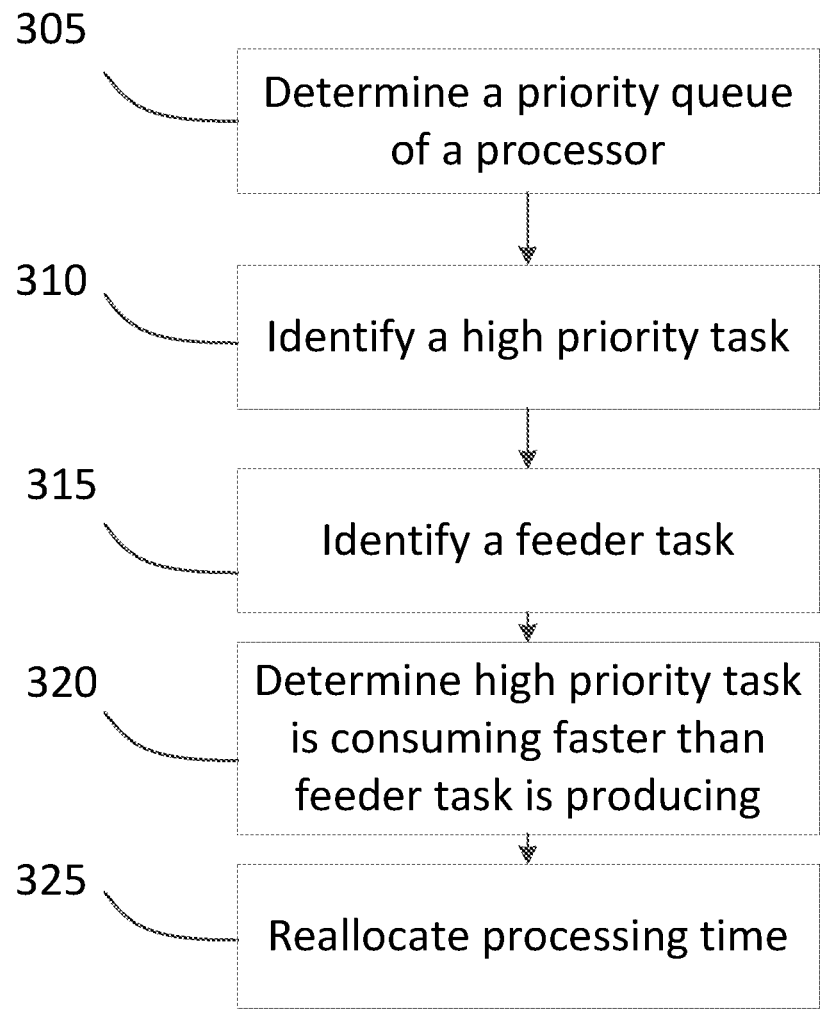
FIG. 3 illustrates a flowchart of one or more embodiments.

Referring to FIG. 3, a flowchart is provided illustrating an example embodiment as described herein. In some embodiments, one or more steps may be omitted and/or one or more additional steps may be included. In some embodiments, one or more of the steps of the flowchart in FIG. 3 may be performed in a different order.

At step 305, a priority queue of a processor is determined. The priority queue may include one or more tasks that are to be processed by the associated processor. In some embodiments, the priority queue may share one or more characteristics with processor queue 210 of FIG. 2. For example, the priority queue may receive tasks from one or more applications and determine which task to process based on priorities assigned to the tasks. As more tasks are received, the priority queue may adjust the order of the tasks in the queue to ensure that higher priority tasks are processed before other lower priority tasks and/or higher priority tasks are provided with more resources than lower priority tasks during processing. The priority queue may be determined (e.g., specified) by an application, such as application 102, and/or one or more components of an application executing on a different processor or executing on the same processor as the processor associated with the priority queue.

At step 310, a high priority task is identified. The high priority task may share one or more characteristics with the high priority task 214 of FIG. 2. In some embodiments, the high priority task have a priority setting that is indicative of a higher priority than one or more other tasks. By having a higher priority, the high priority task may be provided to the processor before other lower priority tasks and/or more processing resources may be allocated to the high priority task than other lower priority tasks.

At step 315, a feeder task is identified. The feeder task may share one or more characteristics with feeder tasks 208a and/or 208b of FIG. 2. In some embodiments, more than one feeder task may be identified. The feeder tasks, once processed by the processor, generate intermediate output that may be consumed by the high priority task as input. For example, the feeder task may be an image pre-processor task that takes image data as input and generates pre-processed image data for consumption by a high priority task.

At step 320, a determination is made that the high priority task is consuming the intermediate output faster than the feeder task is generating the intermediate output. Thus, if the tasks should continue at the same priorities, the high priority task will reach a point where processing of the high priority task will go idle. In some embodiments, the intermediate output is provided to a work queue that can be monitored to determine whether the feeder tasks are keeping pace with the high priority task. For example, the intermediate output may be provided to a queue that shares one or more characteristics with work queue 212, and a monitor, such as monitor 216, may monitor the queue to determine if the inflow of work is less than the outflow of work. Is so, then the high priority task is consuming the intermediate output faster than the feeder task is generating the intermediate output.

At step 325, processing time in the priority queue is reallocated to reduce the ratio of consumption of the intermediate tasks to the production of the intermediate tasks. This may be accomplished by increasing the priority of one or more feeder tasks, by decreasing a priority of the high priority task, or a combination of both. In some embodiments, the re-prioritization of the tasks may be performed by a component that shares one or more characteristics with task scheduler 218. Thus, the re-prioritization can be performed at the application level without requiring re-prioritization being performed at the hardware level.

For example, in some embodiments, task scheduler 218 may send tasks to the processor queue 210 such that 80% of the tasks are high priority tasks and 20% are feeder tasks. If task scheduler determines that the work queue 212 is emptying of intermediate output faster than it is being added to the queue, task scheduler 218 may instead send tasks to processor queue 210 at a rate of 50% feeder tasks and 50% high priority tasks to increase the flow of intermediate tasks to the work queue 212. Subsequently, task scheduler 218 may re-prioritize the task flow to compensate for later states of the work queue 212, such as a state where the work queue 212 is reaching a capacity and more output needs to be consumed than is available.

Figure 4:
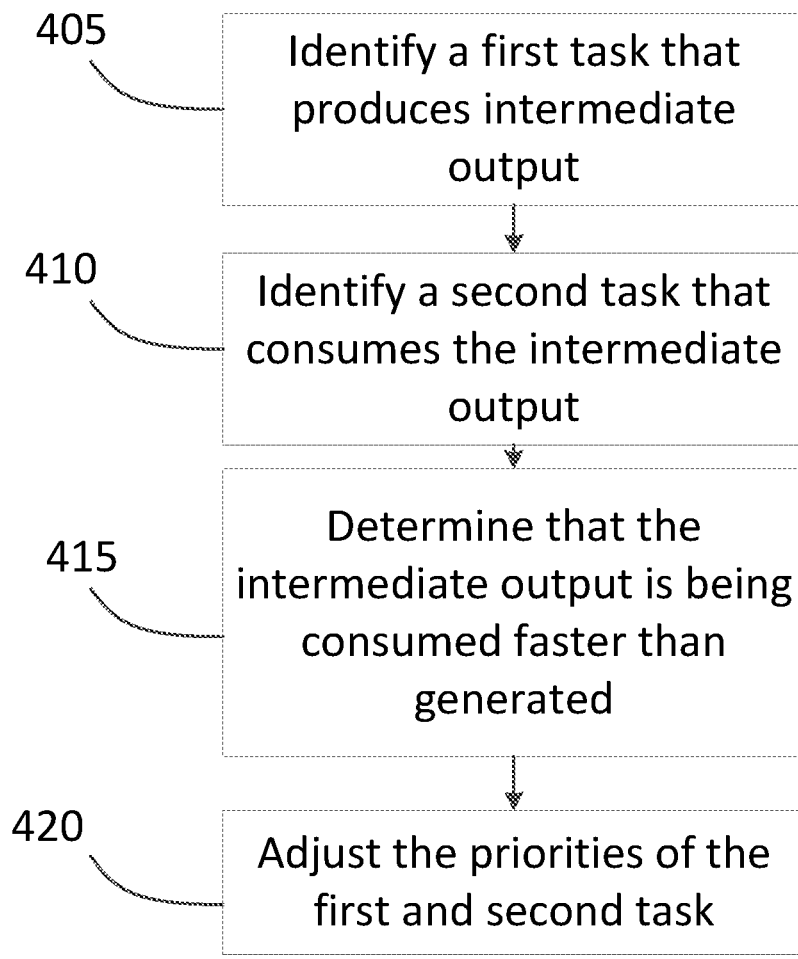
FIG. 4 illustrates a flowchart of one or more embodiments.

Referring to FIG. 4, a flowchart is provided illustrating another example embodiment as described herein. In some embodiments, one or more steps may be omitted and/or one or more additional steps may be included. In some embodiments, one or more of the steps of the flowchart in FIG. 4 may be performed in a different order.

At step 405, a first task is identified that receives input and produces intermediate output that is placed in a work queue. The first task may share one or more characteristics with feeder task 208a and 208b of FIG. 2. The output, in the form of intermediate output, may be provided to a work queue that shares one or more characteristics with work queue 212 of FIG. 2. In some embodiments, the first task may receive input from a database and/or other storage component. In some embodiments, the first task may be an intermediate task that receives its input from one or more other tasks. In some embodiments, additional tasks may be identified as tasks that generate intermediate output and provide the output to the work queue.

At step 410, a second task is identified that consumes the output of the first (and any other tasks) identified at step 405. In some embodiments, the second task can share one or more characteristics with high priority task 214 of FIG. 2. The second task may identify input from the work queue that includes the output of the first task. Thus, the second task is dependent on the output of the first task in order for the second task to be processed. In instances where intermediate output is not available, the second task will be unable to continue processing.

At step 415, the work queue is monitored and a determination is made that the work queue is emptying of intermediate output faster than new intermediate output is being added to the work queue. Thus, the second task may be starved of resources such that it will be unable to continue processing until more intermediate output is available. Because this can lead to inefficient allocation of the resources of the processor, an idle high priority task is unwanted, as previously described. The state of the work queue may be determined by a component that shares one or more characteristics with monitor 216, which may then relay the state to the task scheduler 218. The monitor may include, for example, a synchronization mechanism that may be polled by the task scheduler 218 to determine whether the first task should be given a higher priority for a period of time.

At step 420, the priority of the first task or the second task (or both) is adjusted to alter the amount of intermediate output in the work queue. In some embodiments, the adjustment may include sending fewer of the second tasks to the processor and/or increasing the number of the first tasks that are being sent to the processor. By adjusting the priorities to levels different than the initially assigned priorities, the work queue can be replenished of intermediate output without changing the priorities of the processor queue.

Figure 5:
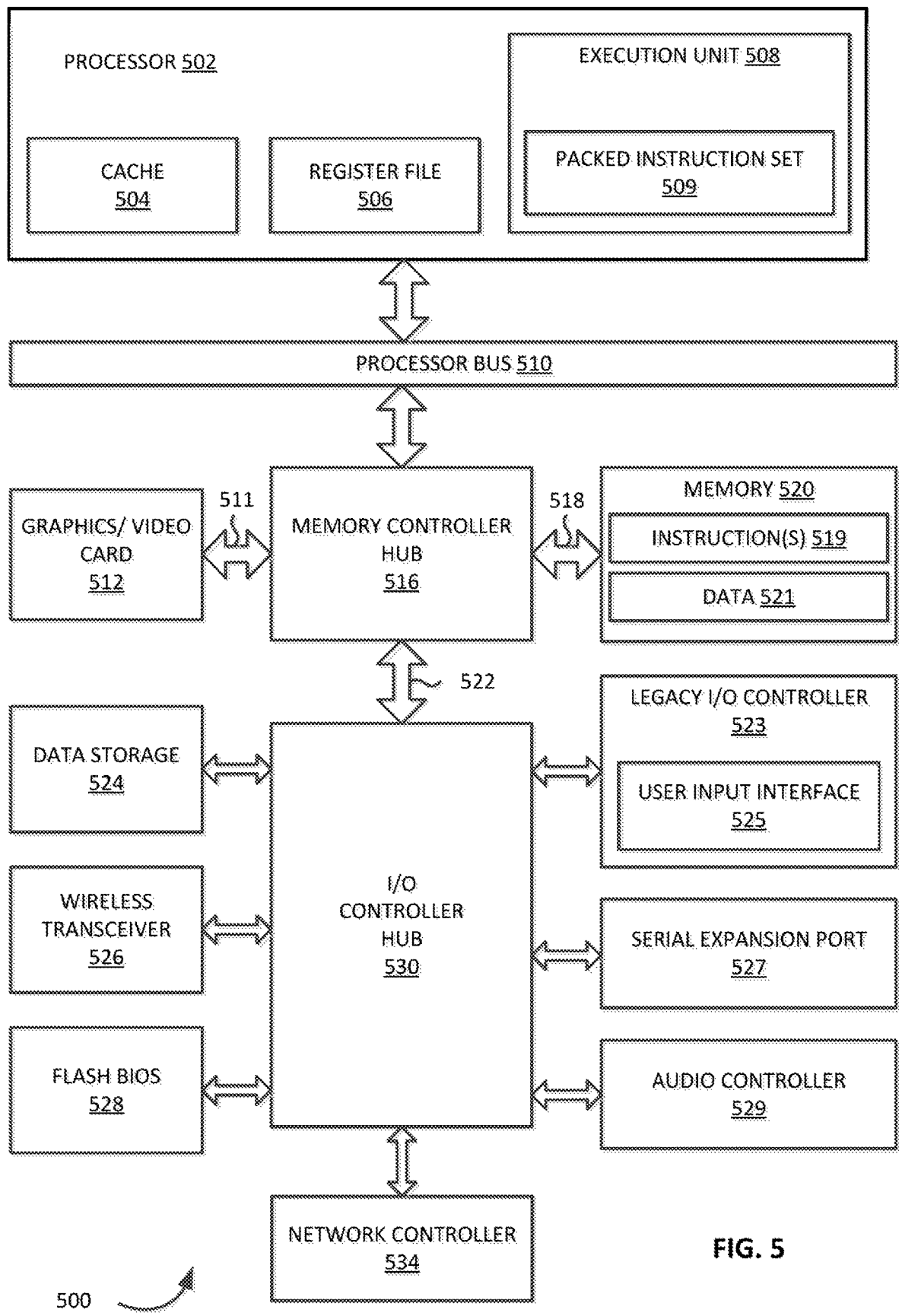
FIG. 5 illustrates a data center system, according to at least one embodiment.

FIG. 5 is a block diagram illustrating an example computer system, which may be a system with interconnected devices and components, a system-on-a-chip (SOC) or some combination thereof 500 formed with a processor that may include execution units to execute an instruction, according to at least one embodiment. In at least one embodiment, computer system 500 may include, without limitation, a component, such as a processor 502 to employ execution units including logic to perform algorithms for process data, in accordance with present disclosure, such as in embodiment described herein. In at least one embodiment, computer system 500 may include processors, such as PENTIUM® Processor family, Xeon™, Itanium®, XScale™ and/or StrongARM™, Intel® Core™, or Intel® Nervana™ microprocessors available from Intel Corporation of Santa Clara, California, although other systems (including PCs having other microprocessors, engineering workstations, set-top boxes and like) may also be used. In at least one embodiment, computer system 500 may execute a version of WINDOWS' operating system available from Microsoft Corporation of Redmond, Wash., although other operating systems (UNIX and Linux for example), embedded software, and/or graphical user interfaces, may also be used.

Embodiments may be used in other devices such as handheld devices and embedded applications. Some examples of handheld devices include cellular phones, Internet Protocol devices, digital cameras, personal digital assistants ("PDAs"), and handheld PCs. In at least one embodiment, embedded applications may include a microcontroller, a digital signal processor ("DSP"), system on a chip, network computers ("NetPCs"), set-top boxes, network hubs, wide area network ("WAN") switches, or any other system that may perform one or more instructions in accordance with at least one embodiment.

In at least one embodiment, computer system 500 may include, without limitation, processor 502 that may include, without limitation, one or more execution units 508 to perform machine learning model training and/or inferencing according to techniques described herein. In at least one embodiment, computer system 500 is a single processor desktop or server system, but in another embodiment computer system 500 may be a multiprocessor system. In at least one embodiment, processor 502 may include, without limitation, a complex instruction set computer ("CISC") microprocessor, a reduced instruction set computing ("RISC") microprocessor, a very long instruction word ("VLIW") microprocessor, a processor implementing a combination of instruction sets, or any other processor device, such as a digital signal processor, for example. In at least one embodiment, processor 502 may be coupled to a processor bus 510 that may transmit data signals between processor 502 and other components in computer system 500.

In at least one embodiment, processor 502 may include, without limitation, a Level 1 ("L1") internal cache memory ("cache") 504. In at least one embodiment, processor 502 may have a single internal cache or multiple levels of internal cache. In at least one embodiment, cache memory may reside external to processor 502. Other embodiments may also include a combination of both internal and external caches depending on particular implementation and needs. In at least one embodiment, register file 506 may store different types of data in various registers including, without limitation, integer registers, floating point registers, status registers, and instruction pointer register.

In at least one embodiment, execution unit 508, including, without limitation, logic to perform integer and floating point operations, also resides in processor 502. In at least one embodiment, processor 502 may also include a microcode ("ucode") read only memory ("ROM") that stores microcode for certain macro instructions. In at least one embodiment, execution unit 508 may include logic to handle a packed instruction set 509. In at least one embodiment, by including packed instruction set 509 in an instruction set of a general-purpose processor 502, along with associated circuitry to execute instructions, operations used by many multimedia applications may be performed using packed data in a general-purpose processor 502. In one or more embodiments, many multimedia applications may be accelerated and executed more efficiently by using full width of a processor's data bus for performing operations on packed data, which may eliminate need to transfer smaller units of data across processor's data bus to perform one or more operations one data element at a time.

In at least one embodiment, execution unit 508 may also be used in microcontrollers, embedded processors, graphics devices, DSPs, and other types of logic circuits. In at least one embodiment, computer system 500 may include, without limitation, a memory 520. In at least one embodiment, memory 520 may be implemented as a Dynamic Random Access Memory ("DRAM") device, a Static Random Access Memory ("SRAM") device, flash memory device, or other memory device. In at least one embodiment, memory 520 may store instruction(s) 519 and/or data 521 represented by data signals that may be executed by processor 502.

In at least one embodiment, system logic chip may be coupled to processor bus 510 and memory 520. In at least one embodiment, system logic chip may include, without limitation, a memory controller hub ("MCH") 516, and processor 502 may communicate with MCH 516 via processor bus 510. In at least one embodiment, MCH 516 may provide a high bandwidth memory path 518 to memory 520 for instruction and data storage and for storage of graphics commands, data and textures. In at least one embodiment, MCH 516 may direct data signals between processor 502, memory 520, and other components in computer system 500 and to bridge data signals between processor bus 510, memory 520, and a system I/O 522. In at least one embodiment, system logic chip may provide a graphics port for coupling to a graphics controller. In at least one embodiment, MCH 516 may be coupled to memory 520 through a high bandwidth memory path 518 and graphics/video card 512 may be coupled to MCH 516 through an interconnect 511 (e.g., Accelerated Graphics Port ("AGP"), PCI-Express (PCIe), AXI, NVLink, or other proprietary bus with similar characteristics).

In at least one embodiment, computer system 500 may use system I/O 522 that is a proprietary hub interface bus to couple MCH 516 to I/O controller hub ("ICH") 530. In at least one embodiment, ICH 530 may provide direct connections to some I/O devices via a local I/O bus. In at least one embodiment, local I/O bus may include, without limitation, a high-speed I/O bus for connecting peripherals to memory 520, chipset, and processor 502. Examples may include, without limitation, an audio controller 529, a firmware hub ("flash BIOS") 528, a wireless transceiver 526, a data storage 524, a legacy I/O controller 523 containing user input and keyboard interfaces 525, a serial expansion port 527, such as Universal Serial Bus ("USB"), and a network controller 534. Data storage 524 may comprise a hard disk drive, a floppy disk drive, a CD-ROM device, a flash memory device, or other mass storage device.

In at least one embodiment, FIG. 5 illustrates a system, which includes interconnected hardware devices or "chips", whereas in other embodiments, FIG. 5 may illustrate an example System on a Chip ("SoC"). In at least one embodiment, devices illustrated in FIG. 5 may be interconnected with proprietary interconnects, standardized interconnects (e.g., PCIe) or some combination thereof. In at least one embodiment, one or more components of computer system 500 are interconnected using compute express link (CXL) interconnects.

Figure 6:
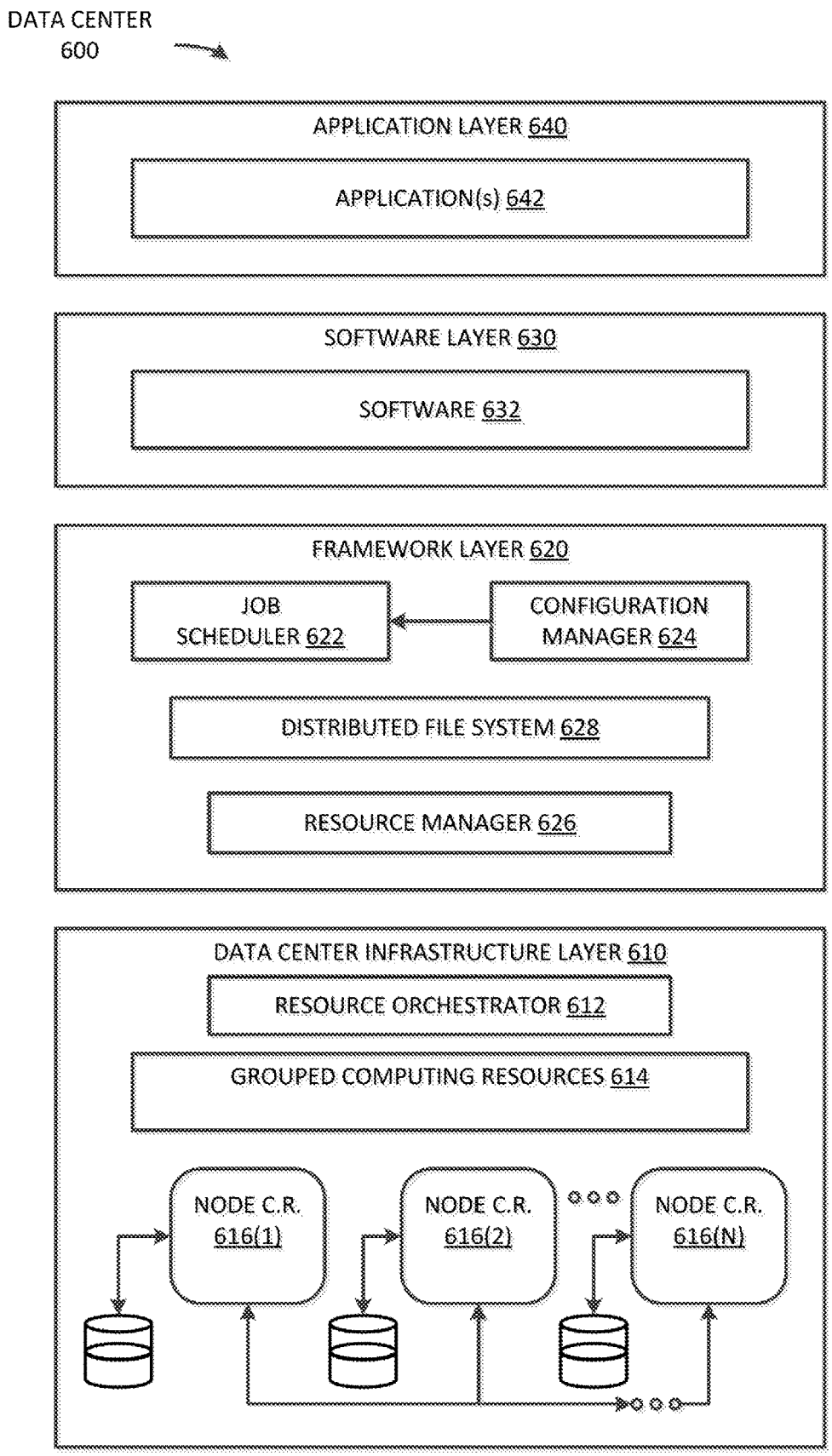
FIG. 6 illustrates a computer system, according to at least one embodiment.

FIG. 6 illustrates an example data center 600, in which at least one embodiment may be used. In at least one embodiment, data center 600 includes a data center infrastructure layer 610, a framework layer 620, a software layer 630, and an application layer 640.

In at least one embodiment, as shown in FIG. 6, data center infrastructure layer 610 may include a resource orchestrator 612, grouped computing resources 614, and node computing resources ("node C.R.s") 616(1)-616(N), where "N" represents any whole, positive integer. In at least one embodiment, node C.R.s 616(1)-1016(N) may include, but are not limited to, any number of central processing units ("CPUs") or other processors (including accelerators, field programmable gate arrays (FPGAs), graphics processors, etc.), memory devices (e.g., dynamic read-only memory), storage devices (e.g., solid state or disk drives), network input/output ("NW I/O") devices, network switches, virtual machines ("VMs"), power modules, and cooling modules, etc. In at least one embodiment, one or more node C.R.s from among node C.R.s 616(1)-1016(N) may be a server having one or more of above-mentioned computing resources.

In at least one embodiment, grouped computing resources 614 may include separate groupings of node C.R.s housed within one or more racks (not shown), or many racks housed in data centers at various geographical locations (also not shown). Separate groupings of node C.R.s within grouped computing resources 614 may include grouped compute, network, memory or storage resources that may be configured or allocated to support one or more workloads. In at least one embodiment, several node C.R.s including CPUs or processors may grouped within one or more racks to provide compute resources to support one or more workloads. In at least one embodiment, one or more racks may also include any number of power modules, cooling modules, and network switches, in any combination.

In at least one embodiment, resource orchestrator 612 may configure or otherwise control one or more node C.R.s 616(1)-616(N) and/or grouped computing resources 614. In at least one embodiment, resource orchestrator 612 may include a software design infrastructure ("SDI") management entity for data center 600. In at least one embodiment, resource orchestrator may include hardware, software or some combination thereof.

In at least one embodiment, as shown in FIG. 6, framework layer 620 includes a job scheduler 622, a configuration manager 624, a resource manager 626 and a distributed file system 628. In at least one embodiment, framework layer 620 may include a framework to support software 632 of software layer 630 and/or one or more application(s) 642 of application layer 640. In at least one embodiment, software 632 or application(s) 642 may respectively include web-based service software or applications, such as those provided by Amazon Web Services, Google Cloud and Microsoft Azure. In at least one embodiment, framework layer 620 may be, but is not limited to, a type of free and open-source software web application framework such as Apache Spark™ (hereinafter "Spark") that may utilize distributed file system 628 for large-scale data processing (e.g., "big data"). In at least one embodiment, job scheduler 622 may include a Spark driver to facilitate scheduling of workloads supported by various layers of data center 600. In at least one embodiment, configuration manager 624 may be capable of configuring different layers such as software layer 630 and framework layer 620 including Spark and distributed file system 628 for supporting large-scale data processing. In at least one embodiment, resource manager 626 may be capable of managing clustered or grouped computing resources mapped to or allocated for support of distributed file system 628 and job scheduler 622. In at least one embodiment, clustered or grouped computing resources may include grouped computing resource 614 at data center infrastructure layer 610. In at least one embodiment, resource manager 626 may coordinate with resource orchestrator 612 to manage these mapped or allocated computing resources.

In at least one embodiment, software 632 included in software layer 630 may include software used by at least portions of node C.R.s 616(1)-616(N), grouped computing resources 614, and/or distributed file system 628 of framework layer 620. One or more types of software may include, but are not limited to, Internet web page search software, e-mail virus scan software, database software, and streaming video content software.

In at least one embodiment, application(s) 642 included in application layer 640 may include one or more types of applications used by at least portions of node C.R.s 616(1)-616(N), grouped computing resources 614, and/or distributed file system 628 of framework layer 620. One or more types of applications may include, but are not limited to, any number of a genomics application, a cognitive compute, and a machine learning application, including training or inferencing software, machine learning framework software (e.g., PyTorch, TensorFlow, Caffe, etc.) or other machine learning applications used in conjunction with one or more embodiments.

In at least one embodiment, any of configuration manager 624, resource manager 626, and resource orchestrator 612 may implement any number and type of self-modifying actions based on any amount and type of data acquired in any technically feasible fashion. In at least one embodiment, self-modifying actions may relieve a data center operator of data center 600 from making possibly bad configuration decisions and possibly avoiding underutilized and/or poor performing portions of a data center.

In at least one embodiment, data center may use CPUs, application-specific integrated circuits (ASICs), GPUs, FPGAs, or other hardware to perform training and/or inferencing using above-described resources. Moreover, one or more software and/or hardware resources described above may be configured as a service to allow users to train or performing inferencing of information, such as image recognition, speech recognition, or other artificial intelligence services.

Other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms "a" and "an" and "the" and similar referents in context of describing disclosed embodiments (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. use of term "set" (e.g., "a set of items") or "subset" unless otherwise noted or contradicted by context, is to be construed as a nonempty collection comprising one or more members. Further, unless otherwise noted or contradicted by context, term "subset" of a corresponding set does not necessarily denote a proper subset of corresponding set, but subset and corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any of following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, term "plurality" indicates a state of being plural (e.g., "a plurality of items" indicates multiple items). number of items in a plurality is at least two, but can be more when so indicated either explicitly or by context. Further, unless stated otherwise or otherwise clear from context, phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause computer system to perform operations described herein. set of non-transitory computer-readable storage media, in at least one embodiment, comprises multiple non-transitory computer-readable storage media and one or more of individual non-transitory storage media of multiple non-transitory computer-readable storage media lack all of code while multiple non-transitory computer-readable storage media collectively store all of code. In at least one embodiment, executable instructions are executed such that different instructions are executed by different processors— for example, a non-transitory computer-readable storage medium store instructions and a main central processing unit ("CPU") executes some of instructions while a graphics processing unit ("GPU") executes other instructions. In at least one embodiment, different components of a computer system have separate processors and different processors execute different subsets of instructions.

Accordingly, in at least one embodiment, computer systems are configured to implement one or more services that singly or collectively perform operations of processes described herein and such computer systems are configured with applicable hardware and/or software that enable performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of disclosure and does not pose a limitation on scope of disclosure unless otherwise claimed. No language in specification should be construed as indicating any non-claimed element as essential to practice of disclosure.

All references, including publications, patent applications, and patents, cited herein are hereby incorporated by reference to same extent as if each reference were individually and specifically indicated to be incorporated by reference and were set forth in its entirety herein.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, term "processor" may refer to any device or portion of a device that processes electronic data from registers and/or memory and transform that electronic data into other electronic data that may be stored in registers and/or memory. As non-limiting examples, "processor" may be a CPU or a GPU. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. terms "system" and "method" are used herein interchangeably insofar as system may embody one or more methods and methods may be considered a system.

In present document, references may be made to obtaining, acquiring, receiving, or inputting analog or digital data into a subsystem, computer system, or computer-implemented machine. process of obtaining, acquiring, receiving, or inputting analog and digital data can be accomplished in a variety of ways such as by receiving data as a parameter of a function call or a call to an application programming interface. In some implementations, process of obtaining, acquiring, receiving, or inputting analog or digital data can be accomplished by transferring data via a serial or parallel interface. In another implementation, process of obtaining, acquiring, receiving, or inputting analog or digital data can be accomplished by transferring data via a computer network from providing entity to acquiring entity. References may also be made to providing, outputting, transmitting, sending, or presenting analog or digital data. In various examples, process of providing, outputting, transmitting, sending, or presenting analog or digital data can be accomplished by transferring data as an input or output parameter of a function call, a parameter of an application programming interface or interprocess communication mechanism.

Although discussion above sets forth example implementations of described techniques, other architectures may be used to implement described functionality, and are intended to be within scope of this disclosure. Furthermore, although specific distributions of responsibilities are defined above for purposes of discussion, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A method executed by a processor in a networked computing resource environment, comprising:
   executing a high priority task in a priority queue of the processor, wherein the priority queue includes requests for a processing time of the processor, the requests including the plurality of tasks;
   executing at least one feeder task in the priority queue, the at least one feeder task producing one or more intermediate outputs for consumption by the high priority task, wherein the high priority task is allocated, a larger amount of processing time of the processor than the at least one feeder task;
   executing a synchronization mechanism indicating that at least one work queue is filled with the one or more intermediate outputs, and that the high priority task is consuming more of the one or more intermediate outputs than the one or more intermediate outputs the at least one feeder task is producing;
   wherein
      a priority for at least the at least one feeder task in the priority queue is adjusted to decrease an amount of switching between at least the at least one feeder task and the high priority task in the at least one work queue;
   the processing time is reallocated in the priority queue based in part on at least the adjusted priority for the at least one feeder task in the priority queue to reduce a ratio of consumption of the one or more intermediate outputs to the production of the one or more intermediate outputs in the at least one work queue; and
   executing the plurality of tasks according to the allocated reallocated processing time in the priority queue.

2. The method of claim 1, wherein reducing the ratio includes increasing a priority of the at least one feeder task in the priority queue.

3. The method of claim 1, wherein reducing the ratio includes decreasing a priority of the high priority task in the priority queue.

4. The method of claim 1, wherein the high priority task and at least one feeder task are part of a deep learning pipeline.

5. The method of claim 4, wherein the at least one feeder task includes receiving image data and processing the image data.

6. The method of claim 5, wherein the high priority task provides output to a deep neural network and the processed image data is utilized as data for training the deep neural network.

7. The method of claim 1, wherein an intermediate output of the one or more intermediate outputs is stored in the at least one work queue.

8. The method of claim 1, wherein the priority queue is associated with one or more additional processors that receive requests including the plurality of tasks.

9. A method executed by a processor in a networked computing resource environment, comprising:
   executing a first task, wherein work completed by the first task is provided to at least one work queue as one or more intermediate outputs;
   executing a second task, wherein the second task consumes the one or more intermediate outputs from the at least one work queue, wherein the first task and the second task are executed according to requests for processing time in a priority queue of the processor;
   executing a synchronization mechanism indicating that the at least one work queue is filled with the one or more intermediate outputs, and that the at least one work queue is being emptied of the one or more intermediate outputs faster than the one or more intermediate outputs are being provided to the at least one work queue;

wherein a priority of at least the first task and in the priority queue is adjusted to decrease an amount of switching between at least the first task and the second task in the at least one work queue, the adjusting resulting in reallocating the processing time in the priority queue for the first task and the second task; and executing the first task and the second task according to the reallocated processing time in the priority queue.

10. The method of claim 9, wherein:

wherein executing the synchronization mechanism further indicates whether the at least one work queue has available resources to receive additional intermediate output; and adjusting the priority of the first task includes increasing an amount of intermediate output provided by the first task to the at least one work queue.

11. The method of claim 10, wherein a result of executing the synchronization mechanism is a binary representation that indicates whether the at least one work queue has available space for more intermediate output.

12. The method of claim 9, further including:

executing a third task, wherein the third task provides output to the at least one work queue as intermediate output, wherein a priority of the third task is adjusted to alter a rate at which intermediate work is being added to the at least one work queue.

13. The method of claim 9, further comprising:

receiving input, wherein the input is provided to the first task for processing, wherein a final output is produced in response to completing processing of the one or more intermediate outputs produced by the second task.

14. The method of claim 13, wherein the input is image data, wherein the first task processes the image data, and wherein the second task provides the final output to train a deep neural network based on the processed image data.

15. A system, comprising:

a processor in a networked computing resource environment for executing a plurality of tasks, the processor to:

execute a high priority task, wherein the high priority task is allocated a larger amount of processing time of the processor than one or more other tasks, and wherein one or more of the requests in a priority queue are related to the high priority task;

execute a feeder task, wherein the feeder task produces one or more intermediate outputs for consumption by the high priority task, wherein the feeder task is a lower priority in the priority queue than the high priority task, and wherein one or more of the requests in the priority queue are related to the feeder task, wherein the requests sent to the priority queue of the processor by the feeder task and the high priority task are adjusted based, at least in part, on (i) execution of a synchronization mechanism indicating that at least one work queue is filled with the one or more intermediate outputs, and that the high priority task is consuming more of the one or more intermediate outputs than the feeder task is producing the one or more intermediate outputs, and ii in response to a priority being adjusted for at least one of the feeder task and the high priority task in the priority queue to decrease an amount of switching between the feeder task and the high priority task in the at least one work queue; and execute the feeder task and the high priority task according to the adjusted requests sent to the priority queue.

16. The system of claim 15, wherein:

the at least one work queue includes intermediate output produced by the feeder task and not yet consumed by the high priority task.

17. The system of claim 15, wherein the processor is further to:

receive input, wherein the input is provided to the feeder task for processing, wherein a final output is produced in response to completing processing of the one or more intermediate outputs by the second task.

18. The system of claim 17, wherein the input is image data, wherein the feeder task processes the image data, and wherein the high priority task provides the final output to train a deep neural network based on the processed image data.

19. The system of claim 15, wherein the processor is further to:

execute a third task, wherein the third task provides output to the at least one work queue as intermediate output, wherein adjust a priority of the third task is adjusted to alter an amount of intermediate output provided to the at least one work queue.

* * * * *